UNITED STATES PATENT OFFICE.

CHARLES S. SANFORD, OF WOONSOCKET, SOUTH DAKOTA.

ANTIFREEZE COMPOSITION DESIGNED PARTICULARLY FOR USE IN RADIATORS OF ENGINE-COOLING SYSTEMS.

1,363,816.

No Drawing.

Specification of Letters Patent. Patented Dec. 28, 1920.

Application filed June 23, 1920. Serial No. 391,180.

*To all whom it may concern:*

Be it known that I, CHARLES S. SANFORD, citizen of the United States, residing in the city of Woonsocket, in the county of Sanborn and State of South Dakota, have invented certain new and useful Improvements in an Antifreeze Composition Designed Particularly for Use in Radiators of Engine-Cooling Systems, of which the following is a specification.

The invention relates to an anti-freeze composition, designed particularly for use in radiators of engine cooling systems, with the effect to prevent the freezing of the cooling medium in the event of low temperature.

In an anti-freeze solution, the main ingredient must of course be water, while the ingredients making up the solution proper are to be added to the water in certain proportions determined by the lowest temperature against which the cooling medium is to be protected. In particular use in automobile radiators, the solution must be such as to be without injurious effect upon the parts of the cooling system, particularly the hose connection.

The present solution in its preferred combination is made up of calcium chlorid, sodium borate, and burnt sugar. The specific proportions of these ingredients are substantially 94% of calcium chlorid, 4% of sodium borate, and 2% of burnt sugar.

The solution made up with water contains that proportion of the composition which will protect the solution against the lowest temperature likely to be encountered, for example it has been found that four pounds of the composition to each gallon of water will protect the solution against a temperature as low as 40° below zero. Of course if the lowest temperature likely to be encountered is less than this, then a smaller proportion of the composition will be used to each gallon of water.

The calcium chlorid of the composition has the well known effect of preventing freezing of water, while the sodium borate and burnt sugar prevent the crystallization of the calcium chlorid in the change of heat conditions of the water.

The composition may be made up as a powder with the ingredients thoroughly mixed, substantially in the proportions named, so that the user may mix with the water the requisite amount of composition to provide a solution which will not freeze at the lowest temperature likely to be encountered.

It has been found that a slightly different composition will produce substantially the same effect both as to anti-freeze protection, and as to neutralizing the otherwise injurious element of the composition. This slightly modified composition consists of calcium chlorid, substantially 92%; potassium nitrate substantially 2%; magnesium sulfate, substantially 2%; sodium sulfate, substantially 2%; and sodium borate, substantially 2%. In this composition as in the preferred one, the calcium chlorid is introduced for the non-freezing effect, while the other ingredients prevent crystallization of the calcium chlorid, neutralize the salt and prevent the corrosive action of such calcium chlorid.

What I claim is:—

An anti-freeze solution made up of calcium chlorid, sodium borate, and burnt sugar substantially in the proportions of 94% of calcium chlorid, 4% of sodium borate, and 2% of burnt sugar.

In testimony whereof I affix my signature.

CHARLES S. SANFORD.